(No Model.) 2 Sheets—Sheet 1.
F. F. LANDIS.
THRASHING MACHINE.
No. 447,032. Patented Feb. 24, 1891.
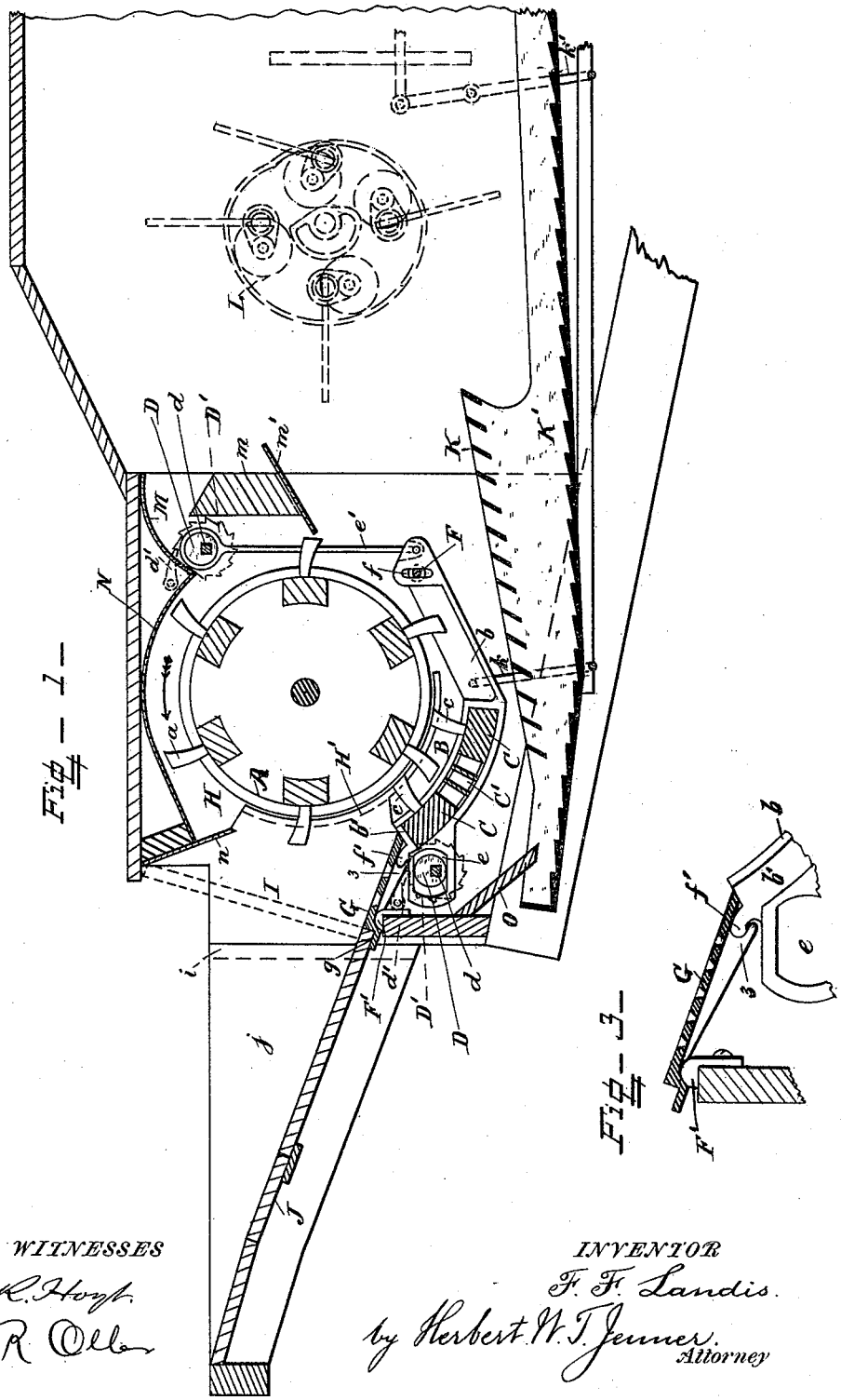
WITNESSES
INVENTOR
F. F. Landis.
by Herbert W. T. Jenner,
Attorney (No Model.) 2 Sheets—Sheet 2.
F. F. LANDIS.
THRASHING MACHINE.
No. 447,032. Patented Feb. 24, 1891.
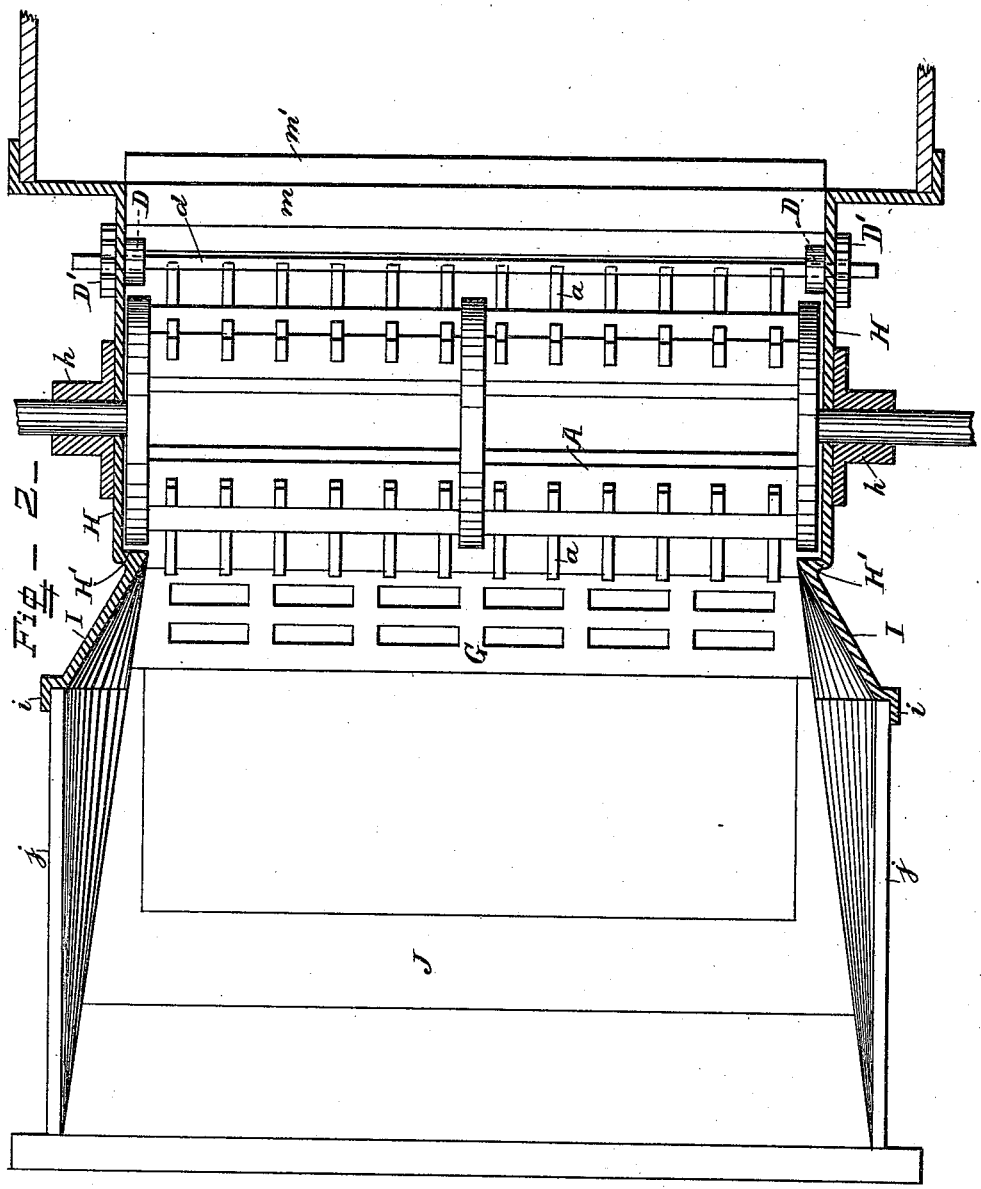
WITNESSES
E. R. K. Hoyt.
Jesse R. Olle
INVENTOR
F. F. Landis
by Herbert W. T. Jenner,
Attorney

UNITED STATES PATENT OFFICE.

FRANK F. LANDIS, OF WAYNESBOROUGH, PENNSYLVANIA.

THRASHING-MACHINE.

SPECIFICATION forming part of Letters Patent No. 447,032, dated February 24, 1891.

Application filed September 15, 1890. Serial No. 365,075. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Thrashing-Machines; and I do hereby declare the following to be a full, clear, and exact description of the invention, such as will enable others skilled in the art to which it appertains to make and use the same.

This invention relates to thrashing-machines; and it consists in the novel construction and combination of the parts hereinafter fully described and claimed, whereby the grain is beaten out.

In the drawings, Figure 1 is a longitudinal section through the thrashing-cylinder and the parts co-operating with it. Fig. 2 is a plan view of the same from above, partly in section. Fig. 3 is a detail view of the perforated plate G and its supports drawn to a larger scale.

A is the thrashing-cylinder, provided with teeth $a$ around its periphery and driven in the direction of the arrow in Fig. 1 by any approved mechanism. (Not shown in the drawings.)

B is the concave, which is supported under the cylinder A. This concave is provided with two similar side plates $b$, having curved grooves $b'$, which are open-ended at the front end of the machine.

C are cross-bars provided with projecting teeth $c$, which are slid in the said grooves, so that the teeth $c$ come between the teeth $a$ on the cylinder. The cross-bars C are removable, and are shown separated by a similarly-removable distance-piece $C'$, which is merely an open frame of metal. Three toothed cross-bars may be used, if desired, or only one cross-bar may be used. When only one toothed cross-bar is used, its position with respect to the two distance-pieces $C'$, which must then be used, may be changed to suit the material being operated on and to make the thrashing action take place at any desired point of the periphery of the cylinder.

The concave is provided with devices for adjusting each end of it. These consist of similar cams D, secured upon the shafts $d$, which may be turned around by hand.

$D'$ are ratchet-wheels secured upon the shafts $d$, and $d'$ are pivoted pawls for holding the cams in any desired position after the concave has been adjusted. The front ends of the side plates $b$ are provided with openings $e$, engaging with the front cams, and the rear ends of the side plates might be similarly supported; but for greater convenience the cams and their shaft are placed in the upper part of the cylinder-chamber, and rods $e'$ are used to suspend the rear ends of the plates $b$ from the said cams.

F is a stop, which engages with a slot $f$ in each plate $b$ and permits the concave to be moved vertically, but prevents it from vibrating longitudinally.

G is a perforated plate, the rear end of which abuts against the side plates of the concave and is provided with hook-shaped lugs 3, which engage with the rounded projections $f'$ upon the plates $b$, and has its front end supported upon the rounded edge of the bar $F'$, which is secured to the front of the machine-casing. The plate G is thus supported in an inclined position and is free to adapt itself to the vertical adjustments of the concave. A ledge $g$ is provided at the front of the plate G for the bottom of the feed-hopper to rest in.

H are the sides of the cylinder-chamber, and $h$ are the bearings in which the cylinder-shaft revolves.

$H'$ are curved flanges, which project around the periphery of the cylinder at each end of it and prevent the straw from getting between the ends of the cylinder and the sides H.

I are the hopper throat-plates, which fit closely against the plate G at the bottom and are joined onto the tops of the curved flanges $H'$ in front of the cylinder. The throat-plates I are flared upwardly and outwardly toward the hopper and are provided with the ledges $i$ for the hopper-sides.

The hopper is provided with an inclined bottom J and with upwardly-flaring sides $j$, and is suitably supported at the front of the machine, as shown in the drawings. The rear portion of the hopper-bottom is made removable, so that it may be tilted up in the ledge $g$ to close the entrance to the cylinder-chamber, as indicated by the dotted lines in Fig. 1.

The peculiar flaring form of the hopper sides and throat-plates greatly increases the efficiency of the machine. The material which is fed into the hopper is naturally most dense in the center, and the double incline upon the throat-plates causes the material at the ends of the cylinder to be compressed into as dense a mass as the material in the center of the cylinder. The work of thrashing is therefore evenly distributed over the whole length of the cylinder, its teeth wear evenly, and the grain and straw are delivered from the cylinder in a stream of equal density and not dense in the middle and loose at the sides, as is the case with machines provided with the ordinary feed-hoppers. The grain is beaten out as it passes between the cylinder and the concave, and both grain and straw fall upon the slats K, which are supported between the sides of the vibrating grain-pan K'. The grain-pan is supported upon the links $k$ and $k'$, and has a longitudinal reciprocating movement imparted to it by rods pivoted to the upper parts of the links $k'$ and other approved mechanism (not shown in the drawings which may be of ordinary construction. The bottom of the grain-pan is upwardly inclined toward the rear, and is serrated in the usual manner to cause the grain to travel over its surface. The slats K are arranged crosswise of the grain-pan and in an upwardly and rearwardly inclined series and partake of the vibrating motion of the grain-pan. The inclination of the slats permits the grain to fall through them into the grain-pan and their motion prevents them from becoming clogged up with short broken straw, and also causes the long straw to be carried rearwardly and delivered to the revolving picker L. (Indicated in dotted lines.) This picker and its coacting devices are not herein more fully described. They may be of various forms, but are preferably constructed as described and claimed in a separate application, Serial No. 365,074, filed on September 15, 1890. It will be noticed that the motion of the slats K insures the rearward travel of the straw from the cylinder to the picking devices and prevents the straw from accumulating in a solid mass in front of the picker.

M is the grain-deflector, consisting of a curved plate secured in the upper part of the cylinder-casing toward the rear for throwing forward all the grain which is carried around with the cylinder past the partition $m$ and the inclined deflecting-plate $m'$.

N is a curved guide-plate extending from the bottom of the grain-deflector M over the top of the cylinder, and thence forwardly at a tangent to the dirt-deflector $n$, which extends crosswise between the sides of the cylinder-chamber. The large grain which is carried around by the cylinder is thrown downward by the plate $m'$, and most of the small grain which is carried past the plate $m'$ is thrown down by the grain-deflector M. Some of the smaller grains and the dirt are, however, carried past the plate M, and this grain is prevented from being broken up by striking against the top of the cylinder-chamber by means of the curved plate N. This small grain and dirt flies off from the curved plate N at a tangent when it reaches the front of the machine, and then strikes against the dirt-deflector $n$. This dirt-deflector prevents the dirt from splashing out of the feed-opening to the inconvenience of the man feeding the machine, and also keeps the wind caused by the motion of the cylinder from rushing out. The current of dirt, wind, and small grain strikes upon the perforated plate G, and the grain and dirt either slide off the plate G onto the concave or pass through the perforations of the plate into the grain-pan behind the series of slats K.

O is a gather-board for conducting the material into the grain-pan.

What I claim is—

1. In a thrashing-machine, the combination, with the concave provided with toothed bars and having apertures in the front ends of its sides, of a transverse shaft provided with cams adapted to be turned to raise or lower the front of the concave, a similar transverse shaft provided with cams and operatively connected to the rear of the concave, and a stop for preventing the concave from being moved longitudinally, substantially as set forth.

2. In a thrashing-machine, the combination, with a revoluble toothed cylinder, of a concave provided with toothed bars and having apertures in the front ends of its sides, the revoluble cams working in the said apertures, the revoluble cams at the rear of the cylinder, the connecting-rods pivotally connecting the rear ends of the said sides with the last said cams, and a stop for preventing the longitudinal motion of the concave and permitting it to be adjusted vertically, substantially as set forth.

3. In a thrashing-machine, the combination, with a vertically-adjustable concave provided with rounded projections at its front end, of a round-topped support secured to the end of the machine-casing, and a perforated plate resting upon the said rounded surfaces in front of the concave and provided with hook-shaped lugs engaging with the said projections and adapted to adjust itself to the vertical adjustments of the concave, substantially as set forth.

4. In a thrashing-machine, the combination, with a revoluble toothed cylinder, of a cylinder-chamber provided with side plates having inwardly-projecting curved flanges H' and upwardly and outwardly flaring hopper throat-plates I, the bottom plate G, provided with a ledge at its front end, the hopper provided with upwardly-flaring sides joining onto the said throat-plates, and an inclined bottom provided with a loose portion resting in the said ledge and adapted to be raised to close the feeding-opening of the machine, substantially as set forth.

5. In a thrashing-machine, the combination, with a revoluble toothed cylinder, of the toothed concave below the front portion of the cylinder, the grain-deflector secured in the upper part of the cylinder-chamber behind the cylinder, a curved guide-plate extending from the said grain-deflector over the top of the cylinder and thence forward at a tangent, and the downwardly and rearwardly inclined dirt and wind deflector secured across the cylinder-chamber in front of the end of the said guide-plate, substantially as and for the purpose set forth.

6. In a thrashing-machine, the combination, with a revoluble toothed cylinder, of a cylinder-chamber provided with side plates, the curved flanges projecting inwardly over the front portion of the cylinder, substantially at a right angle to the side plates, and the hopper throat-plates projecting from the inner edges of the said flanges in front of the cylinder and flaring outwardly toward the hopper and also upwardly in a vertical direction, whereby the side portions of the material are compressed by the double convergence of the throat-plates and fed into the cylinder without obstruction, substantially as set forth.

In testimony whereof I affix my signature in presence of two witnesses.

FRANK F. LANDIS.

Witnesses:
HERBERT W. T. JENNER,
E. R. R. HOYT.